United States Patent [19]

Esterowitz et al.

[11] Patent Number: 5,272,708
[45] Date of Patent: Dec. 21, 1993

[54] TWO-MICRON MODELOCKED LASER SYSTEM

[75] Inventors: Leon Esterowitz, Springfield, Va.; Joseph F. Pinto, Laurel, Md.

[73] Assignee: The United States of America as represented by the Secretary of the Navy, Washington, D.C.

[21] Appl. No.: 968,880

[22] Filed: Oct. 30, 1992

[51] Int. Cl.$^5$ .............................................. H01S 3/10
[52] U.S. Cl. ........................................ 372/20; 372/23; 372/26
[58] Field of Search ............................. 372/20, 23, 26

[56] References Cited

U.S. PATENT DOCUMENTS

| | | | |
|---|---|---|---|
| 4,227,159 | 10/1980 | Barrett et al. | 372/20 X |
| 4,461,006 | 7/1984 | Salour et al. | 372/35 |
| 4,764,933 | 8/1988 | Kozlovsky et al. | 372/40 |
| 4,951,294 | 8/1990 | Basu et al. | 372/75 |
| 4,965,803 | 10/1990 | Esterowitz et al. | 372/5 |
| 4,969,150 | 11/1990 | Esterowitz et al. | 372/20 |
| 4,969,154 | 11/1990 | Esterowitz et al. | 372/68 |
| 5,007,059 | 4/1991 | Keller et al. | 372/18 |
| 5,027,360 | 6/1991 | Nabors et al. | 372/26 X |
| 5,077,750 | 12/1991 | Pocholle et al. | 372/68 |
| 5,099,486 | 3/1992 | Acharekar et al. | 372/32 |
| 5,107,509 | 4/1992 | Esterowitz et al. | 372/20 |
| 5,144,630 | 9/1992 | Lin | 372/23 X |
| 5,197,074 | 3/1993 | Emmons, Jr. et al. | 372/26 |

*Primary Examiner*—John D. Lee
*Attorney, Agent, or Firm*—Thomas E. McDonnell; George Jameson

[57] ABSTRACT

A continuous wave modelocked laser is provided which generates output pulses having a duration in the picosecond range at a repetition rate in the MHz to GHz ranges. The laser includes a laser cavity defined by spaced, opposed reflective member forming a reflective path therebetween; a host laser crystal disposed in the cavity; an acousto-optic modulator disposed between the host laser crystal and one reflective member for modulating the output of the host laser crystal; and a birefringent filter, disposed in the laser cavity between the host laser crystal and the one reflective member, for tuning the laser emission to any one of a plurality of wavelengths within a range between 1.86 μm and 2.14 μm. A pump source pumps the host laser crystal at a wavelength of substantially 785 nm. A collimating plano-convex lens is disposed so that the planar face thereof faces the laser crystal. A mechanical device adjusts the length of the reflective path by axially displacing the one reflective member in the laser cavity so as to match the cavity round trip time to the second harmonic of the drive frequency of the acoustic-optic modulator.

23 Claims, 2 Drawing Sheets

TWO-MICRON MODELOCKED LASER SYSTEM

FIELD OF THE INVENTION

This invention relates generally to solid state lasers and, more specifically, to a two-micron modelocked laser system for generating short (picosecond) duration pulses at (MHz to GHz) high repetition rates.

BACKGROUND OF THE INVENTION

Existing lasers vary greatly with respect to many aspects including, for example, the crystalline host, the dopant materials for the host, the operating power, the operating wavelength, the cavity design, the method of pumping and the mode discipline used (mode-locking, single frequency, or chaotic operation). The single most frequent way in which lasers are identified is by the type of crystaline host or gain material utilized within the laser, since this material will strongly influence, if not dictate, the other considerations for laser design.

The efficient room temperature operation of Tm-doped yttrium-aluminum-garnet (YAG) as a solid state laser material has led to the emergence of such materials as an important source of tunable, coherent radiation in the 2 $\mu$m wavelength region. Continuous wave (diode-pumped), pulsed (flashlamp-pumped) and Q-switched operation of these solid state lasers have generated considerable interest in the use of these lasers in applications such as lidar and medicine. Additionally, ultra-fast pulses generated from these lasers are also usable in spectroscopy, optical communications and nonlinear wavelength conversion applications.

To be useful in some of the above applications, the laser must be able to generate optical pulses having a duration in the picosecond range as well as a repetition rate in the MHz range. One method to accomplish this is to utilize an acousto-optic (AO) modelocker disposed in a lasing cavity to control the pulse duration and repetition of the pulses generated by the laser. Active modelocking techniques have been successfully applied to solid-state lasers generating pulses of picosecond (ps) duration at high repetition rates.

Active modelocking techniques utilizing some form of amplitude modulation (AM), phase or frequency modulation (FM), or a combination of both have been successfully applied to several solid state laser systems. Modelocking through amplitude modulation, i.e., synchronous pumping, relies on nonlinear gain dynamics for pulse formation and is typically reserved for gain media having large stimulated-emission cross sections ($\geq 10^{-17}$ cm$^2$). In contrast, for rare-earth media, such as thulium, that have relatively smaller gain cross section, active modelocking by direct modulation of the loss is more applicable. Modelocking is obtained by modulating the cavity loss at a rate equal to the inverse of the resonator round trip time.

Examples of devices which utilize the active modelocking techniques described above includes a number of modelocked Nd:based lasers which can generate pulses as short as 7 ps at pulse repetition rates ranging from tens of MHz to a few GHz. U.S. Pat. No. 4,951,294 (Basu et al.) discloses the use of an acousto-optic mode locker in an optical cavity to generate picosecond pulses from a Nd:YAG laser which is optically pumped by a laser diode. U.S. Pat. No. 4,764,933 (Kozlovsky et al.) discloses a diode pumped Nd:Glass laser which utilizes an acousto-optic modelocker for generating an output signal comprising short pulses. In another example, modelocked operation of a flash-pumped 2.1 $\mu$m Ho:YAG laser has been provided which generates pulses of 590 ps duration.

Another problem associated with lasers of this type is the need to accurately control the length of the laser cavity. Modelocking is obtained by modulating the cavity loss at a rate equal to the inverse of the cavity round trip time. The round trip time may be controlled by adjusting the length of the laser cavity. Therefore, these parameters are of crucial importance in determining pulse width. In addition, noise produced due to pump laser plasma instabilities, dye jet fluctuations and thermal expansion poses severe difficulties in laser operation.

Several laser devices have been constructed to specifically address this problem. For example, U.S. Pat. No. 4,461,006 (Salour et al.) discloses a laser device in which a cadmium sulfide laser crystal is pumped by an Ar laser. The laser cavity is defined by two mirrors, the first of which is permanently fixed at a distance $L_1$ from the laser crystal and the second mirror which is disposed at a distance $L_2$ which is adjustable to hundredths of a micron. By appropriate adjustment of the second mirror so as to substantially match the length of the laser cavity to the cavity length of the pumping laser, output pulses as short as 8 ps can be obtained.

In applications such as nonlinear wavelength conversion, modelocked lasers are of considerable use, specifically as a pump source for mid infrared (IR) parametric oscillators and amplifiers. Pump sources for such applications must, however, be capable of delivering high peak power outputs. One technique for attaining the required peak powers is by injection modelocking of a Q-switched laser oscillator. For this technique, ultra-short pulses from a continuous wave (CW) modelocked laser are used to seed a Q-switched laser oscillator, thereby producing a packet of high peak power pulses under the giant pulse envelope. For example, U.S. Pat. No. 4,965,803 (Esterowitz et al.) discloses a room temperature, diode pumped, thulium-doped solid state laser which utilizes a Q-switch. Another example of a laser utilizing a Q-switch is that disclosed in U.S. Pat. No. 5,099,486 (Acharekar et al.). This patent discloses a frequency stabilized Ho:YAG laser which is pumped by a flashlamp. The output of the Ho:YAG laser is reflected in a ring path. Disposed in this ring path is a Q-switch, and a mirror and associated piezoelectric transducer for adjusting the mirror. A seed laser is provided to set a reference frequency for the Ho:YAG laser output. In operation, the time period between the initial lasing output of the Ho:YAG laser and the activation of the Q-switch is measured. This time information is utilized to adjust the mirror in the optical path so as to cause the Ho:YAG laser to lase at a frequency which is defined by the seed laser.

SUMMARY OF THE INVENTION

According to the invention, a two-micron modelocked laser system is provided which is capable of generating output pulses of a duration in the picosecond range at a repetition rate in the MHz-GHz ranges.

The two-micron modelocked laser system of the invention comprises a laser cavity defined by a first and second spaced, opposed reflective members forming a reflective path therebetween; a laser crystal disposed in the laser cavity and comprising a host material doped with an activator ion sufficient to produce a laser emission at wavelengths within a range of between approximately 1.86 μm and approximately 2.14 μm; modulating means, disposed between the laser crystal and the second reflective member, for modulating the laser emission; a tuning means, disposed in the laser cavity between the laser crystal and the second reflective member, for tuning the laser emission to any one of a plurality of wavelengths within said range between approximately 1.86 μm and approximately 2.14 μm; a pump source means for pumping the laser crystal at a wavelength of substantially 785 nanometers; a focusing optical element (such as a plano-convex lens or curved reflective mirror) for establishing a tight beam waist of $\omega_0 = 35$ μm in the laser crystal 18 and for collimating the laser emission at a location beyond the second reflective member; and any suitable mechanical means for adjusting the length of the reflective path, by axially displacing the second reflective member in the laser cavity, so as to match the cavity round trip time to the second harmonic of a drive frequency of the modulating means.

Other features and advantages of the invention will be set forth in, or apparent from, the following detailed description of the preferred embodiment of the invention.

DESCRIPTION OF THE PREFERRED EMBODIMENTS

Figure 1:
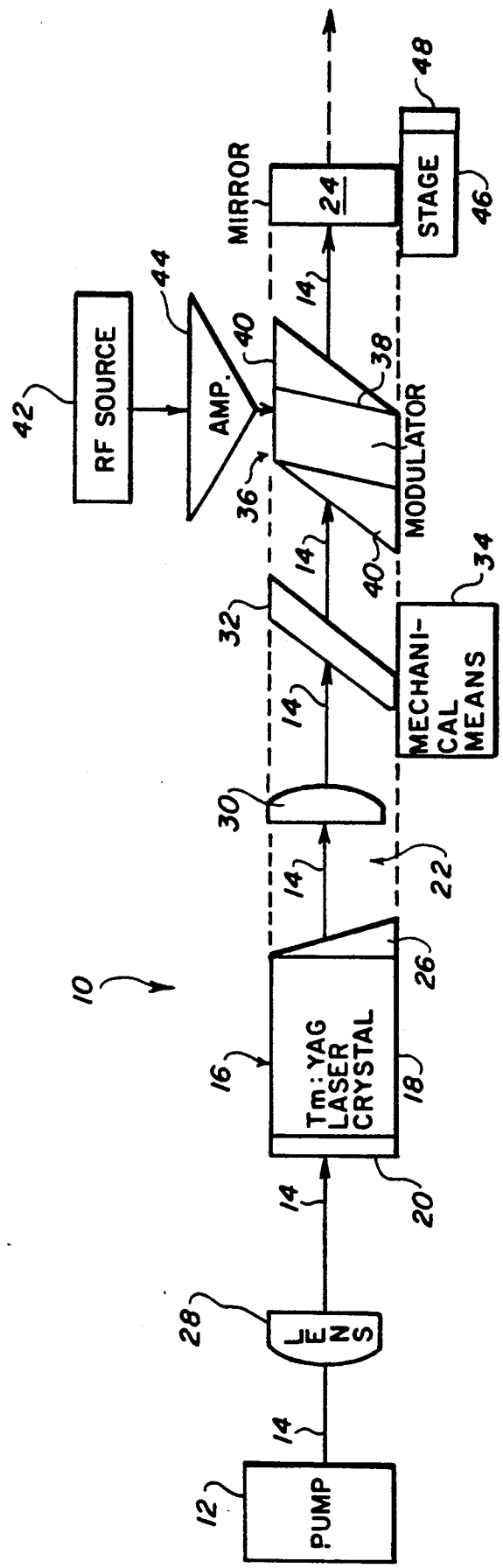
FIG. 1 is a schematic block diagram of a two-micron mode locked solid state laser system constructed in accordance with a preferred embodiment of the invention.

Referring now to the drawings, FIG. 1 illustrates a preferred embodiment of the invention in which a room-temperature, thulium-doped ($Tm^{3+}$- doped) solid state laser device, generally denoted 10, is pumped by a 785 nanometer (nm), continuous wave (CW) laser beam from a pump source 12 to produce a pulsed laser emission at a wavelength of about 2 microns (μm).

Pump source 12 emits a CW 785 nm laser beam, indicated at 14, to co-linearly pump a solid-state laser 16 of laser device 10. Pump source 12 is preferably a Titanium:Sapphire laser operating, as stated, at 785 nm. However, the pump source 12 can also be a GaAlAS laser diode or an GaAlAS laser diode array, and other pumps can be used such as flashlamps, arclamps, other laser diodes, other laser diode arrays, diode-pumped solid state laser, or any other suitable light emitting device operating near 785 nm. It should be noted that the pump source 12 wavelength of 785 nm was chosen because 785 nm is the absorption peak of the thulium in the solid state laser 16.

The solid state laser 16 comprises a laser rod or laser crystal 18 of crystalline or amorphous host material (not shown). The host material can comprise YAG, YSAG, YSGG, YGG, GGG, GSAG, GSGG, LLGG, YALO or YLF as well as mixtures thereof. In a specific exemplary embodiment, the rod 18 is a Tm:YAG rod which is 3 mm long, ¼" in diameter, and is doped with 12% $Tm^{3+}$ ions. Rod 18 has a substantially flat end face 20 which is dielectrically coated for high transmission at 785 nm and high reflection at 2 μm. Flat end face 20 serves as a resonator end mirror for an optical cavity 22 which extends from the flat end face 20 to an output coupler mirror 24, as illustrated in FIG. 1. It should be understood that end face 20 may be a separate mirror spaced apart from the laser crystal 18. Optical cavity 22 is defined by end face 20 and output coupler mirror 24. Output coupler mirror 24 may be selected from a variety of different output couplers and in a preferred embodiment has a transmission (T)=1.5%. The other end face 26 of laser rod 18 is cut and polished at a Brewster's angle to eliminate etalon effects which are deleterious to modelocked operation. Instead of utilizing a Brewster cut end face 26, the end face 26 may be cut slightly wedged (at an exemplary 0.5° to 1° angle) and also be anti-reflective (Ar) coated at 2 μm to minimize etalon effects in the optical cavity 22.

Mode-matching lens 28, having a 5 cm focal length, is disposed between pump source 12 and laser 16 in the path of laser beam 14 for directly focusing the pump beam 14 from pump source 12 into the laser crystal of the laser 16.

An anti-reflection (AR) coated $CaF_2$ plano-convex lens 30 is disposed so that the planar face thereof faces end face 26 of laser rod 18. The lens 30 has a focal length of 5 cm, has an anti-reflective coating at 2 μm, establishes a tight beam waist of $\omega_0 = 35$ μm in the laser rod 18, and collimates the laser beam past beyond the output coupler mirror 24. The lens 30 is tilted at 9° with respect to the beam path 14 to compensate for astigmatism introduced by the Brewster-wedged crystal face 26.

A single quartz birefringent plate or filter 32 of a thickness of 2 mm serves as a tuning element and also acts to restrict the lasing bandwidth during modelocked operation. For tuning purposes a mechanical means 34, such as a rotation stage, is provided to rotate the birefringent plate 32. The output wavelength of laser 10 can be tuned between 1.8 and 2.2 μm. It is noted that commonly assigned U.S. Pat. No. 4,969,150 (Esterowitz et al.) discloses the use of a birefringent plate as a tuning element for Tm:YAG pumped laser, and reference is made to that patent for a further discussion of such a tuning element.

Active modelocking of laser 16 is accomplished with an acousto-optic (AO) modulator 36 located close to the output coupler mirror 24 and within optical cavity 22. An acousto-optic modulator is a device which is used to modulate intracavity losses utilizing an acoustically generated diffraction grating (not shown). In an exemplary preferred embodiment, the modulator 36 comprises a water cooled fused-quartz slab 38 having dimensions of 1 cm × 1 cm × 4 cm. Slab 38 is bonded to a $LiNbO_3$ transducer (not shown), and has Brewster cut ends 40.

A stable radio frequency (RF) signal source 42 and broadband amplifier 44 deliver 1.5 watts of power to drive the AO modulator 36. The AO modulator 36 is operated at its resonant frequency of 150 MHz to minimize reflected rf power losses. In operation, the RF source 42 activates the transducer which in turn generates an acoustic standing wave in the fused-quartz slab 38. This acoustic standing wave generates a periodic time-varying diffraction grating in the slab 38 which modulates the laser output. Optimization of the performance of modelocked laser 10 is accomplished by adjusting the Bragg angle, position, and orientation of modulator 36 in order to maximize the interaction between the emission from laser 16 and the acoustic standing wave.

It should be understood that, in an alternative embodiment, an electro-optic modulator may be substituted for the acousto-optic modulator 36.

To provide modelocked operation, the laser cavity length is adjusted to match the cavity round trip time to that of the second harmonic (300 MHz) of the drive frequency (150 MHz) of modulator 36. Precision control of the cavity length is maintained by mounting the output coupler end mirror 24 on a translation stage 46 equipped with an exemplary differential micrometer 48 to translate the stage 46 further away from or closer toward the flat end face 20.

An average power of 70 mW was obtained from the modelocked laser system 10 at the peak of its tuning curve, at 2.01 μm, when pumped with a 600 mW Ti:-Sapphire laser operating at 785 nm. Stable modelocked pulses of 35 ps. duration, assuming a Gaussian temporal profile, were generated for rf powers of 1.5 W. At this rf power level, the peak amplitude modulation depth of the quartz slab 38 was $\Delta_m = 0.05$.

Figure 2:
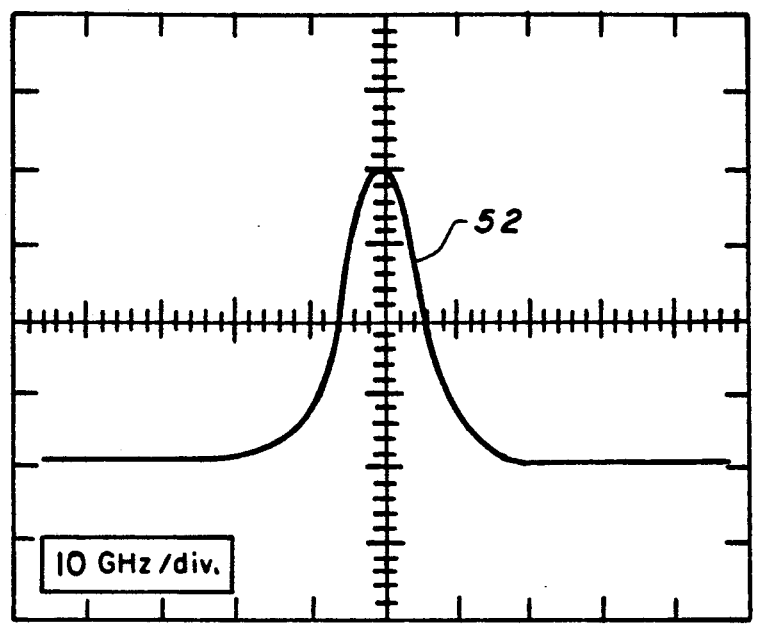
FIG. 2 is a plot of the frequency spectrum of an output pulse generated by the two-micron modelocked laser system of FIG. 1.
Figure 3:
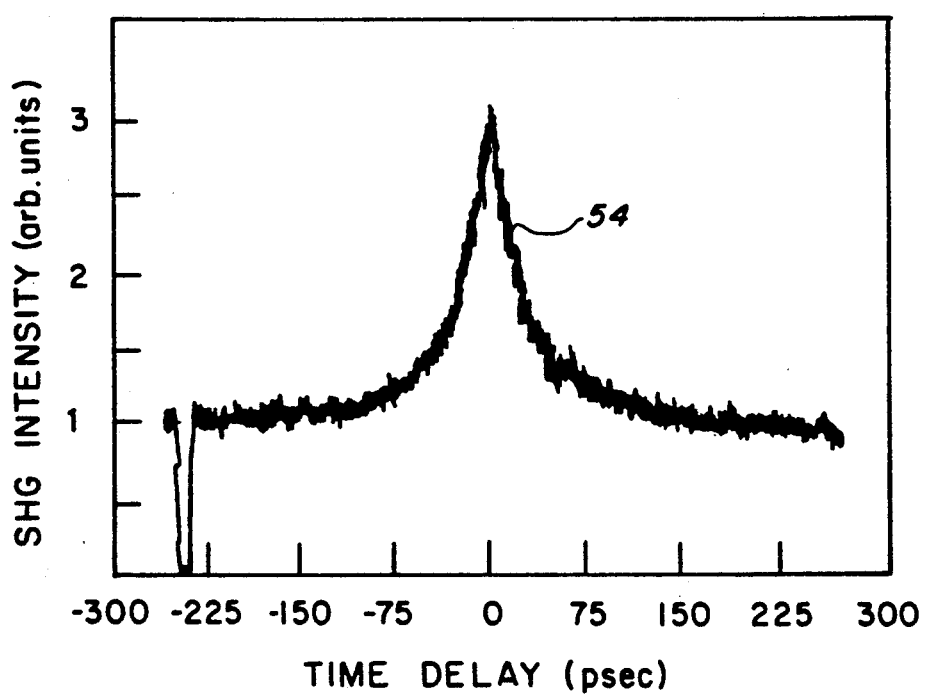
FIG. 3 is a collinear auto-correlation trace of an output pulse generated by the two-micron modelocked laser system of FIG. 1.

The temporal and spectral profiles of the modelocked laser system 10 output were monitored with a second order intensity autocorrelator and a high-finesse scanning Fabry-Perot interferometer having a free spectral range 150 GHz, respectively. FIG. 2 shows the frequency spectrum 52 of a modelocked laser output pulse produced by laser system 10. FIG. 3 shows a collinear intensity autocorrelation trace 54 for a 35 ps. modelocked output pulse produced by laser system 10. The measured bandwidth of the modelocked pulse was 12 GHz (see FIG. 2), resulting in a time-bandwidth product of $\Delta_\nu \Delta_{96} = 0.42 \pm 0.05$. This product is consistent with the time-bandwidth product of 0.44 expected for a transform-limited Gaussian pulse.

The experimental modelocking results set forth above can be compared with predictions based on the steady state amplitude modelocking theory of Kuizenga and Siegman, see IEEE J. Quantum Electron., QE-6, p. 694 (1970). According to this theory, which is valid for homogeneously broadened narrow linewidth gain media, the steady-state mode locked pulse width $\tau_p$ is given by the following equation:

$$\tau_p = \left[ \frac{(2\ln 2)^{\frac{1}{2}}}{\pi} \right] \cdot \left[ \frac{g}{\Delta_m} \right]^{\frac{1}{4}} \cdot \left[ \frac{1}{f_m} \right]^{\frac{1}{2}} \cdot \left[ \frac{1}{\Delta_\nu} \right]^{\frac{1}{2}} \quad (1)$$

where g is the saturated round trip amplitude gain coefficient, $\Delta_m$ is the peak amplitude modulation depth, $f_m$ is the drive frequency of AO modulator 36, and $\Delta_\nu$ is the linewidth of the 2.01 μm laser transition. The steady state pulsewidth dependance on the amplitude and rise time of the applied fractional loss modulation is given by the first two factors of the above equation. With the values of $g = 0.04$ and $\Delta_m = 0.05$, and $f_m = 150$ MHz and an approximate transition linewidth $\Delta_\nu$ approximately equal to 750 GHz, the predicted steady state pulse width is 33 ps, which is in good agreement with the observed pulse width measurement of 35 ps.

Although the present invention has been described with respect to specific exemplary embodiments thereof, it will be understood by those skilled in the art that other variations and modifications can be effected in these exemplary embodiments without departing from the scope and spirit of the invention.

What is claimed and desired to be secured by Letters Patent of the United States is:

1. A modelocked laser system comprising:
   a laser cavity defined by first and second spaced, opposed reflective members forming a reflective path therebetween, said second reflective member being an output coupler;
   a laser crystal disposed in said laser cavity, said laser crystal having a host material doped with an activator ion sufficient to produce a laser emission at wavelengths within a range between approximately 1.86 μm and approximately 2.14 μm;
   tuning means disposed in said laser cavity between said laser crystal and said second reflective member for tuning said laser emission to any one of a plurality of wavelengths within said range between approximately 1.86 μm and approximately 2.14 μm;
   modulating means disposed between said laser crystal and said second reflective member for modulating the laser emission in said laser cavity to cause the laser system to produce modelocked laser output pulses; and
   pump source means for pumping said laser crystal.

2. The laser system of claim 1 wherein:
   said host material is selected from the group consisting of YAG, YSAG, YSGG, YGG, GGG, GSAG, GSGG, LLGG, YALO, YLF and mixtures thereof.

3. The laser system of claim 1 wherein:
   said host material is doped with a concentration of $Tm^{3+}$ activator ions sufficient to produce a laser emission at substantially 2 μm.

4. The laser system of claim 3 wherein:
   said host material is doped with substantially 12% $Tm^{3+}$ activator ions.

5. The laser system of claim 1 wherein:
   said laser crystal further comprises an end coated with a dielectric material, said dielectric material forming said first reflective member.

6. The laser system of claim 1 wherein:
   said laser crystal further comprises an end face selected from the group consisting of a wedge-shaped end face and a Brewster cut end face.

7. The laser system of claim 1 wherein said laser crystal further comprises:
   a first end coated with a dielectric material forming said first reflective member; and
   a second end having a surface selected from the group consisting of a wedge shaped surface and a Brewster cut surface.

8. The laser system of claim 1 wherein:
   said modulating means comprises an acousto-optic modulator.

9. The laser system of claim 1 wherein:
   said modulating means comprises an electro-optic modulator.

10. The laser system of claim 1 wherein said tuning means comprises:
    a filter; and
    mechanical means for rotating said filter to tune said laser emission to any one of a plurality of wavelengths within said range between approximately 1.86 μm and approximately 2.14 μm.

11. The laser system of claim 10 wherein:
    said filter comprises a birefringent filter.

12. The laser system of claim 10 wherein:

said filter is rotatable and angularly adjustable by said mechanical means.

13. The laser system of claim 10 wherein:
said filter comprises a birefringent filter; and
said mechanical means is a motor.

14. The laser system of claim 1 further comprising:
a lens disposed between said pump source means and said laser crystal, for directly focusing a pump beam from said pump source means into said laser crystal.

15. The laser system of claim 1 further comprising:
a focusing element for establishing a beam waist of a preselected width in said laser crystal and for collimating said laser emission at a location beyond said second reflective member.

16. The laser system of claim 15 wherein:
said focusing element establishes a preselected beam waist in said laser crystal.

17. The laser system of claim 15 wherein:
said focusing element is a plano-convex lens.

18. The laser system of claim 17 wherein:
said plano-convex lens is constructed from $CaF_2$, has a preselected focal length, and has an anti-reflective coating at 2 $\mu$m.

19. The laser system of claim 17 wherein:
said plano-convex lens is tilted with respect to said reflective path to compensate for astigmatism introduced by said laser crystal.

20. The laser system of claim 15 wherein:
said focusing element comprises reflective optics.

21. The laser system of claim 1 wherein
said modulating means includes:
  a modulator selected from the group consisting of an acoustic-optic modulator and an electro-optic modulator; and
  RF source means for developing a drive signal having a drive frequency to drive said modulator at said drive frequency; said laser system further comprising:
means for axially displacing said second reflective member in said laser cavity to match the cavity round trip time to a frequency corresponding to the second harmonic of the drive frequency of said modulating means.

22. The laser system of claim 21 wherein said axially displacing means comprises:
a translation stage coupled to said second reflective member;
a differential micrometer coupled to said translation stage for adjusting the position of said translation stage to control the length of said laser cavity.

23. A modelocked laser system comprising:
a laser cavity defined by first and second spaced, opposed reflective members forming a reflective path therebetween;
a host laser crystal disposed in said laser cavity, said host laser crystal comprising a host material doped with an activator ion sufficient to produce a laser emission at wavelengths within a range between approximately 1.86 $\mu$m and approximately 2.14 $\mu$m;
modulating means disposed between said host laser crystal and said second reflective member for modulating the laser emission;
tuning means disposed in said laser cavity between said host laser crystal and said second reflective member for tuning said laser emission to any one of a plurality of wavelengths within said range between approximately 1.86 $\mu$m and approximately 2.14 $\mu$m;
a pump source means for pumping said host laser crystal at a wavelength of substantially 785 nanometers;
a plano-convex lens, disposed so that a planar face of said plano-convex lens faces said host crystal material, for establishing a preselected beam waist in said host material and for collimating said laser emission at a location beyond said second reflective member; and
means for adjusting the length of said reflective path, by axially displacing said second reflective member in said laser cavity.

* * * * *